United States Patent [19]

Utsumi et al.

[11] Patent Number: 5,636,267
[45] Date of Patent: Jun. 3, 1997

[54] CLEANING SYSTEM FOR TELEPHONE NUMBER LIST

[75] Inventors: Katsunori Utsumi; Teruyo Nakamoto, both of Tokyo, Japan

[73] Assignee: Jintec Corporation, Tokyo, Japan

[21] Appl. No.: 610,429

[22] Filed: Mar. 4, 1996

[51] Int. Cl.$^6$ ................................................ H04M 1/56
[52] U.S. Cl. ........................ 379/67; 379/355; 379/381; 379/382
[58] Field of Search ............................ 379/354, 355, 379/216, 67, 88, 89, 376, 381, 382

[56] References Cited

U.S. PATENT DOCUMENTS

| | | | |
|---|---|---|---|
| 5,075,894 | 12/1991 | Iwase et al. | 379/386 |
| 5,259,026 | 11/1993 | Johnson | 379/207 |
| 5,309,505 | 5/1994 | Szlam et al. | 379/88 |
| 5,371,787 | 12/1994 | Hamilton | 379/386 |
| 5,483,586 | 1/1996 | Sussman | 379/216 |

OTHER PUBLICATIONS

Mechanism to Automate Updating Obsolete Telephone Numbers, Apr. 1994, 115, vol. 37, No. 4A IBM Techinical Disclosure Bulletin.

*Primary Examiner*—Krista M. Zele
*Assistant Examiner*—Daniel S. Hunter
*Attorney, Agent, or Firm*—Barnes & Thornburg

[57] ABSTRACT

A cleaning system for a telephone number list is capable of automatically perform deleting process for null telephone number and updating process for re-writing telephone number list. The cleaning system includes calling portion for transmitting a dialing signal corresponding to each telephone number in a telephone number list to a public telephone network, line monitoring portion for monitoring reaction on the line with respect to the transmission of the dialing signal by the calling portion, effectiveness judging portion for making judgement of an effective telephone number when a ring tone, an off-hook signal prior to detection of the ring tone, within a predetermined period, null telephone number discriminating portion for making judgement that the telephone number checked is null when none of the ring tone, off-hook signal and a busy tone, and outputting portion for generating output lists with distinguishing the effective telephone numbers and the null telephone numbers on the basis of the results of discrimination by the effectiveness judgement portion and the null telephone number.

5 Claims, 3 Drawing Sheets

CLEANING SYSTEM FOR TELEPHONE NUMBER LIST

BACKGROUND OF THE INVENTION

1. Field of the Invention

The present invention relates generally to a cleaning system for a telephone number list. More specifically, the invention relates to a cleaning system for a telephone number list in a customer list and so forth to be used in tele-marketing and so forth, for deleting null telephone numbers from the telephone number list.

2. Description of the Related Art

In various businesses utilizing telephone, a telephone number list is quite important information and thus has to be maintained for deleting telephone numbers which become unnecessary or are found null from the list to keep reasonable reliability and whereby to prevent degradation of the value of the contained information. The customer information in such list naturally contains variable information. One of such variable information is the telephone number. Namely, the telephone number of the customer may be varied due to termination of use of the registered telephone number, changing to other telephone number, and can be null as originally registered. Such telephone numbers, through which customers cannot be reached, will be generally referred to as "null telephone number" throughout the disclosure and appended claims. In order to keep reasonable reliability of the list, such null telephone numbers has to be deleted from the list or to be replaced with correct or new telephone numbers.

Conventionally, maintenance of the list has been performed upon giving a phone call to respective customers according to the telephone number list in certain businesses. Namely, deletion or updating of the null telephone numbers has been done with verifying response from respective customers.

The conventional telephone number list cleaning method for deleting and updating the list associating with business inherently cause significant waste and absurdity or irrationality in certain type of businesses. Namely, performing business to the customers having null telephone numbers which should be deleted from the list, wasteful expense should be incur to cause a trouble on people who are not customers. On the other hand, for the customers who has moved, it is possible to redundantly perform businesses to the old telephone number and the new telephone to cause waste both in time and cost.

SUMMARY OF THE INVENTION

In view of the inconvenience in the prior art, it is an object of the present invention to provide a cleaning system for a telephone number list, which can automatically perform deleting process for null telephone number in advance of performing business, without requiring performance of actual business.

Another object of the present invention is to provide a cleaning system for a telephone number list which can automatically and efficiently perform updating process for re-writing telephone number list.

In order to accomplish the above-mentioned and other objects, a cleaning system for a telephone number list, according to the first aspect of the present invention, comprises:

loading means for loading a telephone number list to be subject to a cleaning process, in a memory;

calling means for reading out each telephone number contained in the telephone number list stored in the memory and transmitting a dialing signal corresponding to the each telephone number to a public telephone network;

line monitoring means for monitoring reaction on the line with respect to the transmission of the dialing signal by the calling means;

effectiveness judging means for making judgement of an effective telephone number when a ring tone is detected within a predetermined period, or when an off-hook signal is detected prior to detection of a ring tone;

null telephone number discriminating means for making judgement that the telephone number checked is null when none of the ring tone, off-hook signal and a busy tone is detected within a predetermined period; and outputting means for generating output lists with distinguishing the effective telephone numbers and the null telephone numbers on the basis of the results of discrimination by the effectiveness judgement means and the null telephone number discriminating means.

The cleaning system may further comprise means for commanding the calling means to repeat a call according to a predetermined procedure with respect to called telephone number on which a busy tone is detected by the line monitoring means.

Also, the cleaning system may further comprise second effectiveness judgement means for making judgement of the effective telephone number when a signal having equal frequency to the ring tone is detected by the line monitoring means.

Furthermore, a cleaning system may further comprise:

response recording means for recording a signal on the line with correspondence to the null telephone number in the output lists in a predetermined medium when none of the ring tone, off-hook signal and busy tone is detected within a predetermined period by the line monitoring means; and response reproducing means for reproducing the recorded signals by the response recording means, corresponding to each null telephone number.

According to the second aspect of the invention, a cleaning system for a telephone number list comprises:

loading means for loading a telephone number list to be subject to a cleaning process, in a memory;

calling means for reading out each telephone number contained in the telephone number list stored in the memory and transmitting a dialing signal corresponding to the each telephone number to a public telephone network;

line monitoring means for monitoring reaction on the line with respect to the transmission of the dialing signal by the calling means;

effectiveness judging means for making judgement of an effective telephone number when a ring tone is detected within a predetermined period, or when an off-hook signal is detected prior to detection of a ring tone;

voice recognition means which is active when none of the ring tone, the off-hook signal and the busy tone is detected by the line monitoring means within a given period after initiation of call, and for recognizing a specific voice signal on the line;

changing number recognizing means for making judgement of effectiveness of a new telephone number contained in a guidance message when the guidance message announcing change of the telephone number is detected by the voice recognition means;

null telephone number discriminating means for making judgement that the telephone number checked is null when the guidance message announcing the change of the telephone number is not detected by the voice recognition means; and outputting means for generating output lists with distinguishing the effective telephone numbers and the null telephone numbers on the basis of the results of discrimination by the effectiveness judgement means, the changing number recognizing means and the null telephone number discriminating means.

In a subscriber line interface of the public telephone network, a response to a call is one of the following items:

(a) ring tone: a signal indicative of ringing at the called party;

(b) busy tone: a signal indicative of busy condition at the called party or, in the alternative, indicative of incapability of establishing communication to the called party through the public telephone network;

(c) shunt of loop current associating with off-hook: a signal indicative of the fact that the called party off-hooks the telephone receiver; and (d) signal other than the foregoing not resulting in off-hook In the subscriber interface, when the called party off-hooks, reversal of polarity is inherently caused. Therefore, when a sound is detected other than the ring tone and busy tone without causing reversal of the polarity, the status should be one of the following situations.

(d1) transmission of talkie due to erroneous number a voice guidance message "this telephone number is not used" as recorded voice message transmitted from the exchange when non-subscribed telephone number is used;

(d2) transmission of talkie due to change number a voice guidance message "telephone number has been changed, new number is **" as recorded message transmitted from the exchange when the telephone number is changed due to moving or so forth;

(d3) special information sound a signal indicative of the status neither in busy state nor ringing state from an international automatic exchange;

(d4) ringing at called party of free call response to free call, such as dial number 133 for NTT, free dial and so forth, which does not cause reversal of polarity.

In the cleaning system according to the first aspect of the invention, as set forth above, call is made for each of the telephone numbers in the telephone number list so that judgement of effective telephone number is made when the response to the call is (a) ring tone, (c) reversal of polarity (off-hook) before generation of ring tone. The telephone numbers judged as effective are written in the output list.

When the busy tone is detected as (b), it is handled as distinction between the busy state of the called party and the state of incapability of establishing communication is not possible. Thus, such telephone number, on which busy tone is detected, is re-dialed at an appropriate timing.

On the other hand, the second effectiveness judgement means does not make accurate detection of (a) the ring tone by discriminating the ring tone from the busy tone on the basis of the frequency and the intermitting pattern, but makes judgement as the ring tone when the signal having the same frequency to the ring tone is detected. Since the judgement can be made within quite short period, a possibility of cutting off the line with judgement of effectiveness of the telephone number before causing ringing in the telephone machine of the called party can be significantly increased. This reduces possibility of troubling the called party by ringing.

When the response signal to the call is (d) signal other than the ring tone and the busy tone without causing reversal of the polarity (off-hook), the signal on the line is recorded for a predetermined period of time. Subsequently, the operator intervenes to reproduce the recorded signal to verify whether the recorded signal is the talkie due to change of telephone number (d2) or not. When the recorded message is the talkie of change of telephone number, the telephone number is replaced with new telephone number as the effective telephone number.

In the second aspect of the invention, the analysis of content of talkie is performed automatically by the voice recognition means instead of manual operation by the operator, and the telephone number is automatically updated as the effective telephone number by the change number recognition means.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiments, with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
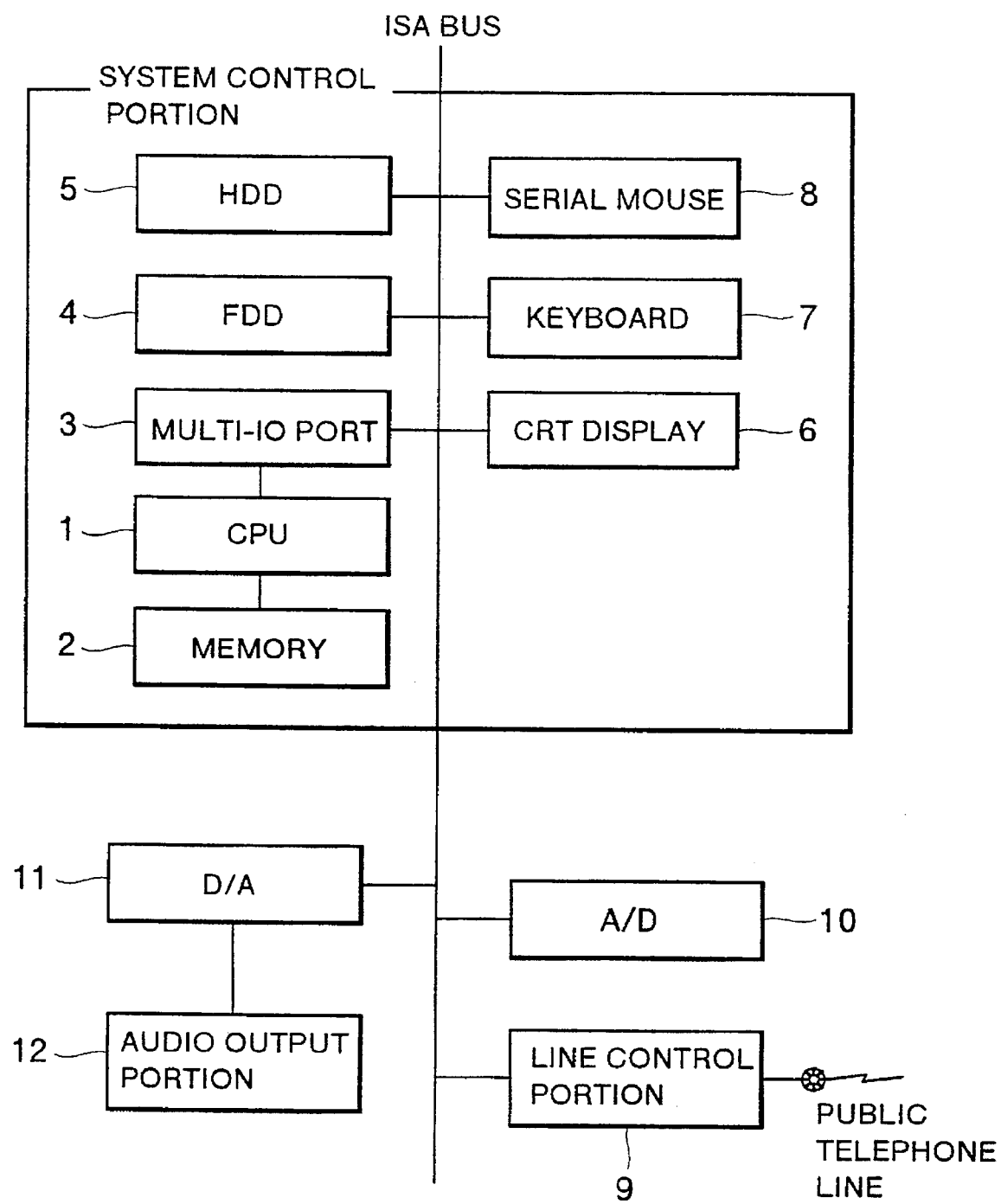
FIG. 1 is a schematic block diagram of the preferred embodiment of a hardware construction of a cleaning system for a telephone number list according to the present invention.

FIG. 1 shows a system construction of the preferred embodiment of a cleaning system for a telephone number list, according to the present invention. The cleaning system has a hardware construction mainly constituted of a personal computer. Namely, for a personal computer which is composed by connecting peripheral devices, such as a floppy disk drive 4, a hard disk drive 5, a display device 6, a keyboard 7, a mouse 8 and so forth to a processor system constituted with a CPU 1 and a memory 2, via a multi input/output port 3, a connection control and so forth to a public telephone network is performed. Also, the personal computer is connected with a circuit control portion 9 including a signal discrimination circuit for discriminating reaction of circuit line in response to a call, an A/D converter 10 for digital recording of a voice signal on the circuit line, a D/A converter 11 for reproducing a digital recorded signal and an audio output portion 12.

A telephone number list to be cleaned is provided on a floppy disk recorded in a predetermined format. The floppy disk containing the telephone number list is set in the floppy disk drive 4 and a cleaning command is given by designating a list name through a keyboard 7. Then, the CPU 1 reads out the designated telephone number list from the floppy disk and stores in the memory 2. Thereafter, the CPU 1 initiates execution of cleaning process shown in FIG. 2.

At first, respective telephone numbers are picked up from the telephone number list according to a predetermined order for transferring to the circuit control portion 9, and a call command is provided (step 100). By this action, call operation is performed by transmitting a dial signal of the telephone number to the public telephone network (step 101). Then, at step 102, waiting state is maintained for an appropriate period (corresponding to a time to actuate a local exchange). Thereafter, reaction of the line in response to the call is monitored by the signal discrimination circuit of the circuit control portion 9 through processes at step 103 and subsequent steps.

When busy tone is detected initially in response to a call to a certain telephone number, the line is cut-off instantly (step 104). Then, the telephone number on which the busy tone is detected, is written in a re-dialing queue (step 105), and the process is returned to step 100.

On the other hand, when off-hook (polarity reverse) signal is detected in response to call to a certain telephone number (when called party off-hooks in response to the call), the process is advanced through steps 103→106→107→108 to instantly cut-off the line and the telephone number on which the off-hook signal is detected is written in an effective telephone number list. Thereafter, process is returned to step 100.

When a ring tone is detected in response to the call to a certain telephone number (most ordinary response), the process is advanced through steps 103→106→109→107→108 to instantly cut-off the line and the telephone number on which the ring tone is detected is written in an effective telephone number list. Thereafter, process is returned to step 100.

When neither busy tone, off-hook signal nor ring tone is detected in response to call to a certain telephone number, the process is advanced through steps 103→106 109→110 and a routine for recording audio signal on the line. In this recording routine, a time schedule is set for recording signal on the line for a given period after expiration of another given period after initiation. In the recording routine, the audio signal on the line is converted into a digital signal by the A/D converter 10 and recorded on the hard disk drive 5. After expiration of the given period for recording, the connection is cut-off (step 111), and the telephone number, on which neither busy tone, off-hook signal nor ring tone is detected, is then written in a null telephone number list (step 112). It should be noted that in the null telephone number list prepared at step 112, a recorded data pointer indicative of the position of the data recorded in the hard disk drive 5 at step 110 is written with correspondence to the relevant telephone number. Finally, the process is returned to step 100.

As set forth above, call is made for respective of the telephone numbers in the telephone number list, sequentially. Depending upon the responses to the call, effectiveness of respective telephone numbers is checked. Namely, when the response to the call is the busy tone (a) or off-hook signal (c) is detected before a generation of ring tone, the corresponding telephone numbers are regarded to be effective and these are written in the effective telephone number list. On the other hand, when the response to respective call is the signal (d) other than the ring tone or busy tone without causing reversal of the polarity, the corresponding telephone number is judged as null telephone number and thus is written in the null telephone number list. Simultaneously, the signal on the line is recorded for the given period with correspondence to the telephone number.

On the other hand, the telephone numbers, on which the busy tone are detected at step 103, are written in the re-dialing queue and are handled so that such telephone numbers can be an object for call at step 100 at appropriate timing. It should be noted that when the busy tone is repeatedly detected in the same telephone number, a note is given for such telephone number in the re-dialing queue. When times of re-dialing reaches a predetermined number and the busy tone is still detected, such telephone number is removed or erased from the re-dialing queue and is written in a busy telephone number list.

The effective telephone number list, the null telephone number list and the busy telephone number list are output lists. These lists are displayed on the display device 6 from time to time during cleaning process. When process for all telephone numbers in the input list including those in the re-dialing queue is finished, completion of cleaning is announced by means of the display device 6 or so forth. At this stage, the output lists may be output to the floppy disk drive 4 in a predetermined format. The effective telephone number list in the output lists thus contains only telephone numbers, on which normal call operation can be performed and other telephone numbers are omitted therefrom.

During cleaning operation or after completion of cleaning operation, when an operator designates one of telephone numbers with observing the null telephone number list displayed on the display device 6 by placing a cursor on the corresponding display position, then, the content recording in step 110 is reproduced in the following manner. As set forth, a recorded data pointer is added for the null telephone number list. Therefore, when one of the telephone number in the null telephone number list is designated, the recorded data at the portion of the hard disk drive 5 corresponding to the pointer is read out, and output as voice or audible sound from an audio output portion 12 with digital-to-analog conversion performed by the D/A converter 11. The operator listens the reproduced voice sound for checking whether the recorded sound is "talkie due to change of the telephone number". If the "talkie due to change of the telephone number" is recorded, a new telephone number is heard from a voice announcement message to enter new telephone number as announced and an updating command are input through the keyboard 7. Then, the new and updated telephone number is added to the effective telephone number list, and fact of updating is written in the null telephone number.

Figure 3:
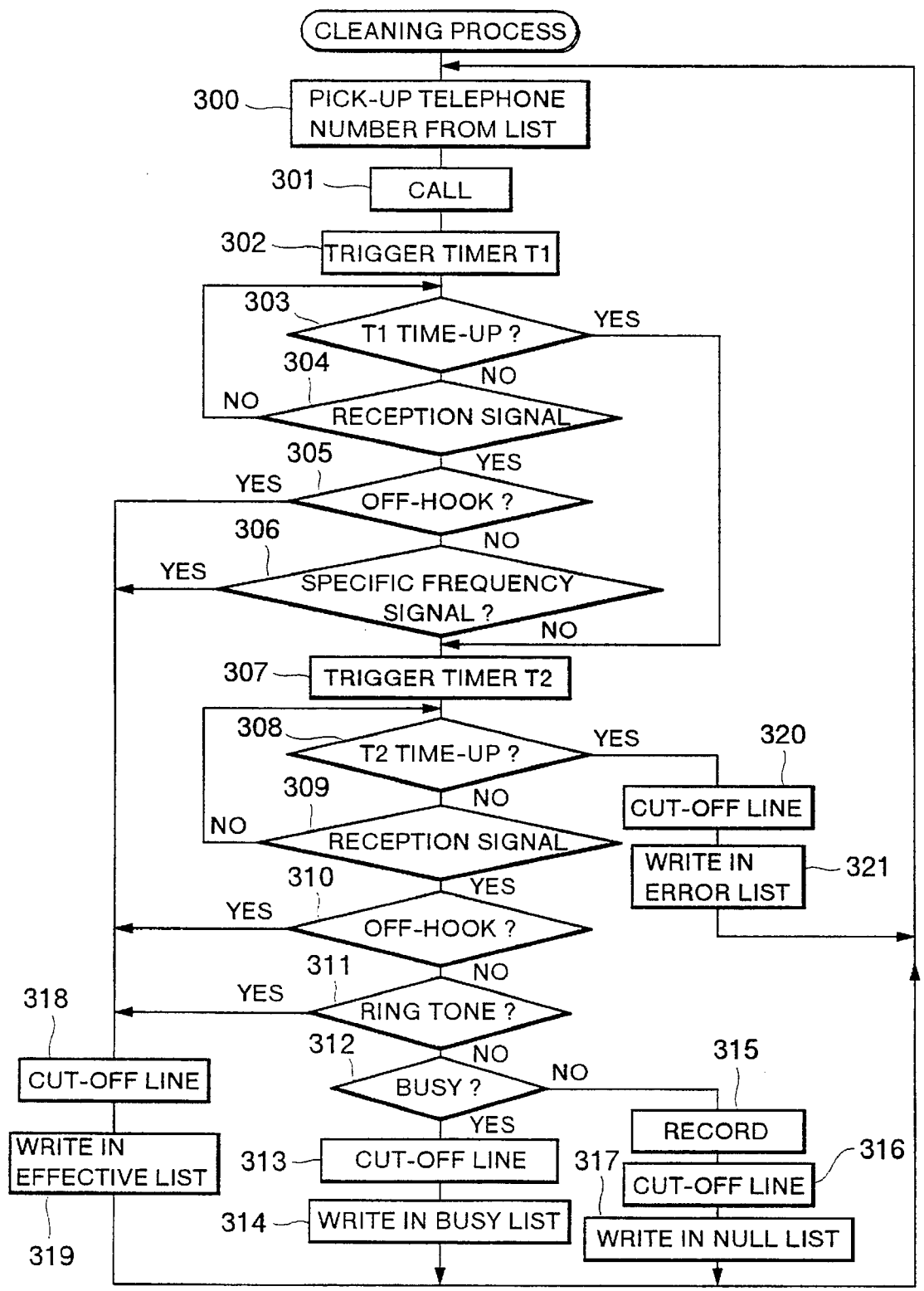
FIG. 3 is a flowchart showing major part of cleaning process in another embodiment of the cleaning system according to the invention.

FIG. 3 shows another example of the cleaning process to be executed by the CPU 1.

As shown in FIG. 3, call command is provided for each of the telephone numbers in the telephone list in one by one basis in a given order. Then, call operation is performed by transmitting dialing signal for the selected telephone number (steps 300 to 301). Next, a timer T1 having a set period of approximately 10 sec. is triggered for checking time-up (step 302 to 303).

During the set period of the timer T1, the reception signal of the response from the called party on the line, is waited (step 304). Once the reception signal is detected, a check is performed whether the reception signal is off-hook signal or a signal of a specific frequency (305, 306). Here, the signal of the specific frequency is the signal having the equal frequency to the ring tone. It should be noted that since the busy tone has the same frequency to the ring tone, the answer at step 306 becomes positive when the ring tone or the busy tone is received after calling.

Figure 2:
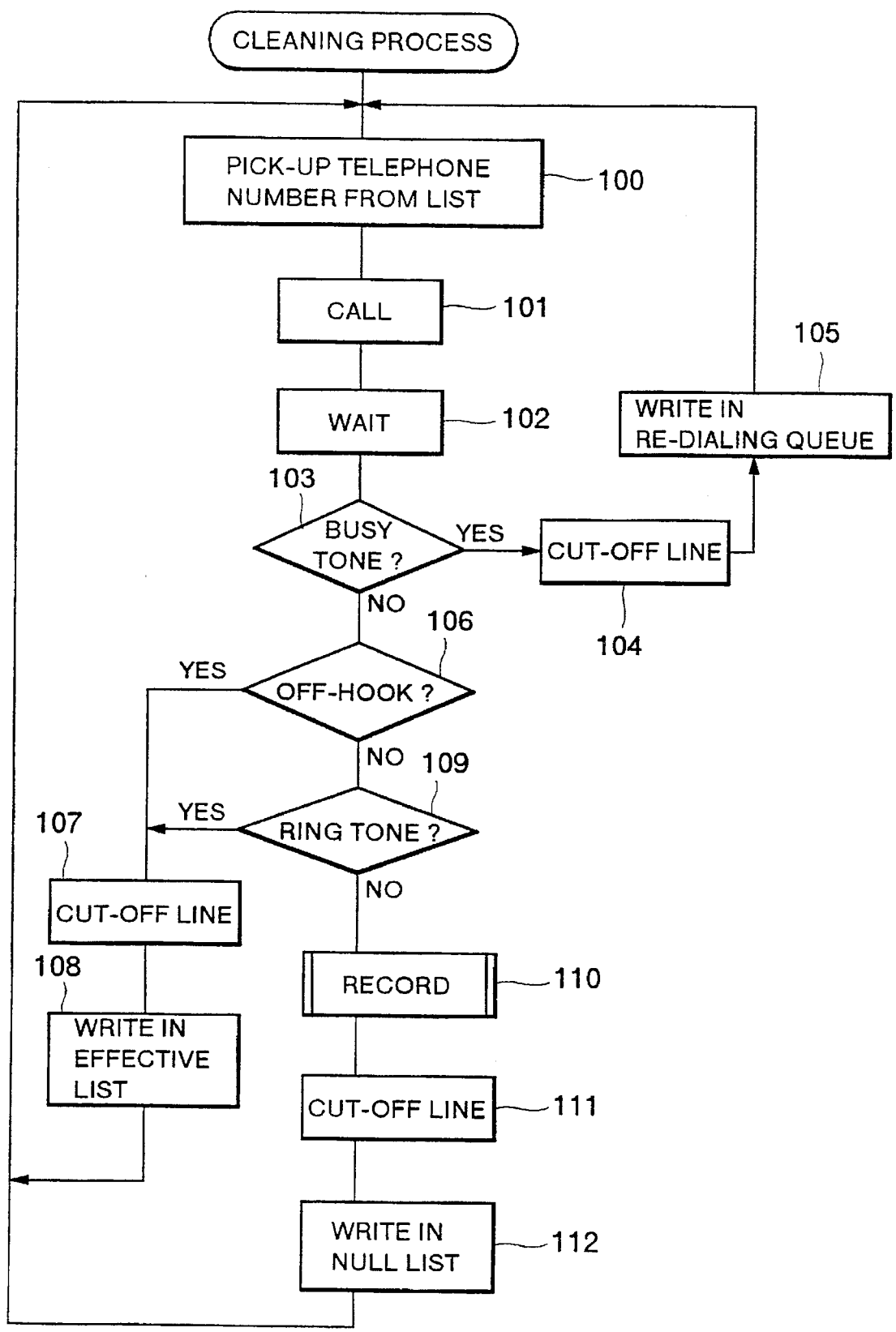
FIG. 2 is a flowchart showing major part of cleaning process in the preferred embodiment of the cleaning system according to the invention.

On the other hand, in the judgements as discussed with respect to, steps 103 and 109 of FIG. 2 and the judgements at steps 311 and 312 of FIG. 3 as discussed later, a discrimination is not performed by only frequencies of the busy tone and the ring tone. Namely, in the present invention, the busy tone and the ring tone are accurately discriminated by analysis of intermitting pattern. However, at step 306, when the frequency of the reception signal is the specific frequency, it is regarded as ring tone or the busy-back signal in a quite short period.

When positive answer is attained at step 305 or 306, the line is instantly cut-off and the called telephone number is written in the effective telephone number list and the process is returned to the initial step 300 (steps 318 to 319). Namely, as long as the reception signal has the same frequency to the ringtone (or the busy tone), it is regarded as the ring tone within a quite short period to make the called telephone number effective. By this, a, frequency of cutting off the line before actually ringing the telephone machine of the called party with judgement of the effective telephone number can be increased. Therefore, it becomes possible to reduce possibility of troubling the called parties by the ring sound.

When the reception signal is detected to make the answers at steps 305 and 306 NO, or when no reception signal is detected and thus the answers at both steps 305 and 306 are held NO for the given period to cause time-up of the timer T1, the process is advanced to steps 307 to 308 to trigger a timer T2 having a set period of approximately 5 sec. for checking time-up of the timer T2. During the set period of the timer T2, a check is performed whether the reception signal is present or not (step 309). If the reception signal is present as checked at step 309, a discrimination is performed whether the reception signal is the off-hook signal, the ring tone or the busy tone (steps 310, 311, 312). When the off-hook signal or the ring tone is detected, the line is instantly cut-off, the called telephone number is written in the effective telephone number, and the process returns to the initial step 300 (318 to 319).

When the busy tone is detected, the line is cut-off, the called telephone number is written in the busy telephone number list, and the process is returned to the initial step 300 (313 to 314). In this case, the busy tone is cased due to lack of digit in the telephone number, and thus re-dialing is not performed.

When the reception signal is received but the reception signal is not the off-hook signal, the ring tone and the busy tone, the recording routine similar to the former embodiment is executed for recording the received sound for a given period. After recording, the line is cut-off, and the called telephone number is written in the null telephone number list (step 315 to 316 to 317). On the other hand, when the set period T2 of the timer T2 is expired without receiving the reception signal, the line is cut-off, and the called telephone number is written in an error list (steps 320 to 321).

In the present invention, it is possible that the "talkie due to change of the telephone number" is performed in real time by means of a voice recognition system. Namely, when none of the ring tone, the off-hook signal or busy tone is detected within the predetermined period after calling of one telephone number, the signal on the line is input to the voice recognition system, and a check is automatically. the check is whether the sound signal of the "talkie due to change of the telephone number" is transmitted on the line or not and when the content of the message is "talkie due to change of the telephone number", new telephone number is recognized from the message to write in the effective telephone number list, automatically.

It may be possible to expand the function of the cleaning system of the present invention to adapt the circuit control portion 9 and its associated circuit portions to a plurality of lines. Then, the cleaning process can be performed in parallel by employing a plurality of lines.

As set forth above, according to the present invention, without making actual businesses (certain communication with the customers) on the basis of the telephone number list to be cleaned, the telephone numbers which become null can be automatically and efficiently deleted or erased. Therefore, it becomes unnecessary to waste a cost without executing business for the null customers which have to be deleted. Also, possibility to trouble people other than customers can be reduced. Furthermore, in the former embodiment, by intervention of the operator, re-writing and updating of the telephone number list can be efficiently performed. In the later embodiment, re-writing and updating of the telephone number list can be performed automatically. Therefore, waste of time and cost caused by redundant businesses for old telephone number and new telephone number, can be solved. Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cleaning system for a telephone number list comprising:

loading means for loading a telephone number list to be subject to a cleaning process, in a memory;

calling means for reading out each telephone number contained in said telephone number list stored in said memory and transmitting a dialing signal corresponding to said each telephone number to a public telephone network;

line monitoring means for monitoring reaction on the line with respect to the transmission of the dialing signal by said calling means;

effectiveness judging means for making judgment of an effective telephone number and disconnecting the line immediately when a ring tone is detected within a predetermined period, or when an off-hook signal is detected prior to detection of a ring tone;

null telephone number discriminating means for making judgment that the telephone number checked is null and disconnecting the line when none of the ring tone, off-hook signal and a busy tone is detected within a predetermined period; and outputting means for generating output lists with distinguishing the effective telephone numbers and the null telephone numbers on the basis of the results of discrimination by said effectiveness judgment means and said null telephone number discriminating means.

2. A cleaning system as set forth in claim 1, which further comprises means for disconnecting the line and commanding said calling means to repeat a call according to a predetermined procedure with respect to called telephone number on which busy tone is detected by said line monitoring means.

3. A cleaning system as set forth in claim 1, which further comprises second effectiveness judgment means for making judgment of the effective telephone number and disconnecting the line immediately when a signal having equal frequency to the ring tone is detected by said line monitoring means.

4. A cleaning system as set forth in claim 1, which further comprises:

response recording means for recording a signal on the line with correspondence to the null telephone number in said output lists in a predetermined medium and disconnecting the line thereafter when none of the ring tone, off-hook signal and busy tone is detected within a predetermined period by said line monitoring means; and response reproducing means for reproducing the recorded signals by said response recording means, corresponding to each null telephone number.

5. A cleaning system for a telephone number list comprising:

loading means for loading a telephone number list to be subject to a cleaning process, in a memory;

calling means for reading out each telephone number contained in said telephone number list stored in said memory and transmitting a dialing signal corresponding to said each telephone number to a public telephone network;

line monitoring means for monitoring reaction on the line with respect to the transmission of the dialing signal by said calling means;

effectiveness judging means for making judgment of an effective telephone number and disconnecting the line immediately when a ring tone is detected within a predetermined period, or when an off-hook signal is detected prior to detection of a ring tone;

voice recognition means which is active when none of said ring tone, said off-hook signal and said busy tone is detected by said line monitoring means within a given period after initiation of call, and for recognizing a specific voice signal on the line and disconnecting the line thereafter;

changing number recognizing means for making judgment of effectiveness of a new telephone number contained in a guidance message when the guidance message announcing change of the telephone number is detected by said voice recognition means;

null telephone number discriminating means for making judgment that the telephone number checked is null when the guidance message announcing the change of the telephone number is not detected by said voice recognition means; and outputting means for generating output lists with distinguishing the effective telephone numbers and the null telephone numbers on the basis of the results of discrimination by said effectiveness judgment means, said changing number recognizing means and said null telephone number discriminating means.

* * * * *